United States Patent [19]

Stubbs

[11] Patent Number: 5,021,964
[45] Date of Patent: Jun. 4, 1991

[54] FRANKING MACHINE

[75] Inventor: Timothy C. Stubbs, Birmingham, United Kingdom

[73] Assignee: GEC Avery Technology Limited, United Kingdom

[21] Appl. No.: 326,390

[22] Filed: Mar. 21, 1989

[30] Foreign Application Priority Data

Apr. 6, 1988 [GB] United Kingdom ............. 8808023

[51] Int. Cl.$^5$ ............................................. G07B 17/00
[52] U.S. Cl. ............................. 364/464.03; 177/25.15
[58] Field of Search ................. 177/25.15; 364/464.02, 364/464.03, 466

[56] References Cited

U.S. PATENT DOCUMENTS 4,787,046 11/1988 Feinland et al. ............... 364/464.03
4,872,119 10/1989 Kajimoto ....................... 364/464.03

FOREIGN PATENT DOCUMENTS 2066736 7/1981 United Kingdom ........... 364/464.02

Primary Examiner—Parshotam S. Lall
Assistant Examiner—Edward R. Cosimano
Attorney, Agent, or Firm—Kirschstein, Ottinger, Israel & Schiffmiller

[57] ABSTRACT

A franking machine includes a printer for impressing postal franks on articles such as letters. The machine further includes a weighing pan coupled to a load cell, a microprocessor operative to respond to the output of the load cell for controlling the operation of the printer, and a keyboard whereby the scale of charges appropriate to an article to be weighed and franked can be entered by the user, the arrangement being such that an article can be weighed, the appropriate value of postal charges calculated by the microprocessor and subsequently franked in the same machine.

4 Claims, 3 Drawing Sheets

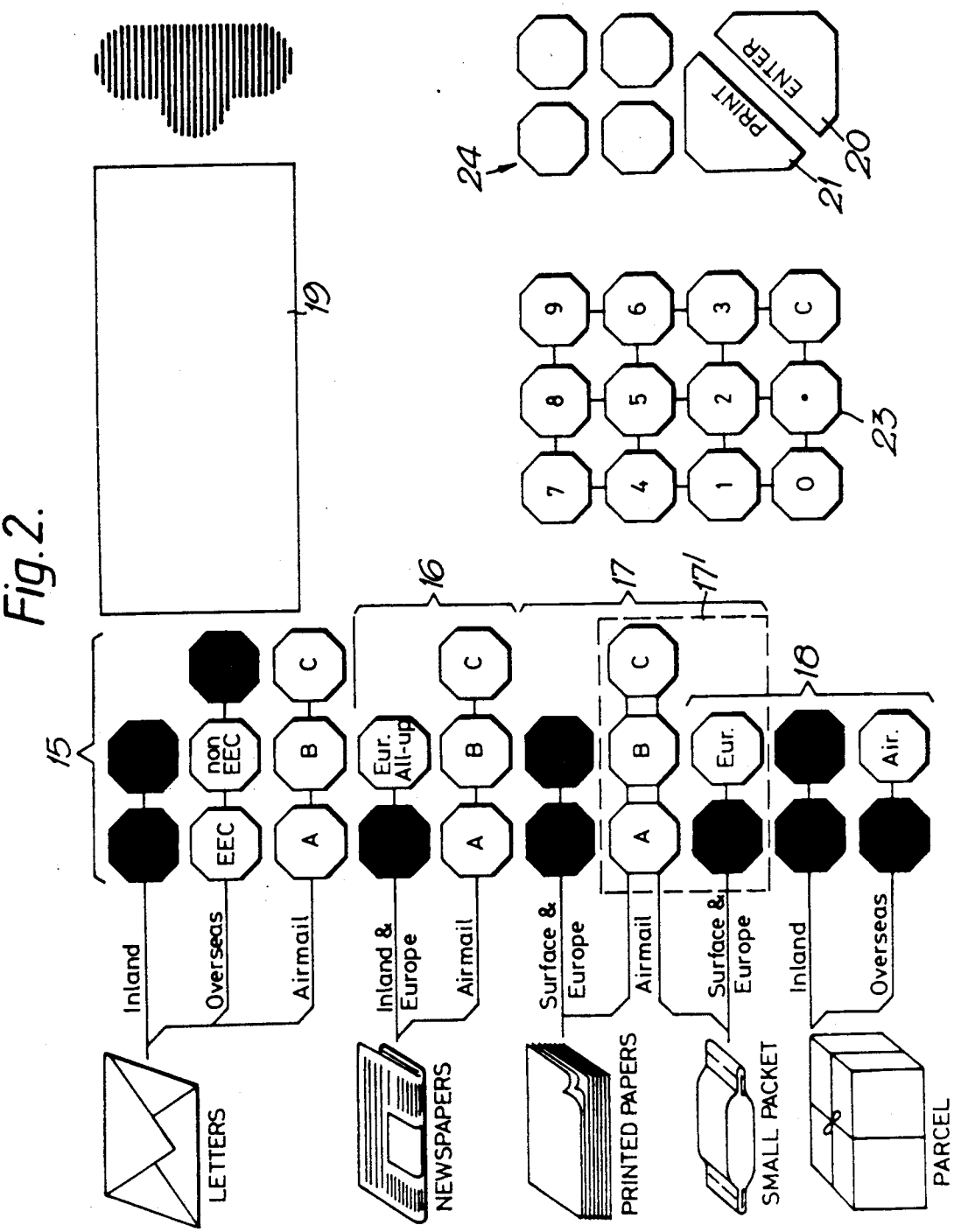

FRANKING MACHINE

BACKGROUND OF THE INVENTION

1. Field of the Invention

The present invention concerns are widely used by companies and organizations which are heavy users of the postal system.

2. Description of Related Art

When using current franking machines the post to be sent is first weighed, the weight compared with a tariff table and then the rate of charge entered on the franking machine. The weighed envelope or parcel is then conveyed to the franking machine. It will be appreciated that this procedure involves the use of two separate machines. An even greater disadvantage is that where a sequence of articles of differing weights have to be sent under the saae basic postal rate the franking machine has to be individually adjusted for each of the articles.

SUMMARY OF THE INVENTION

The present invention has for an object to alleviate this disadvantage.

Accordingly the present invention consists in a franking machine corprising a weighing pan associated with a load cell, printing means for impressing postal franks on articles such as letters or labels, a microprocessor responding to the output of the load cell and controlling the operation of the printing means, and input means whereby the scale of charges appropriate to an article to be weighed and franked can be entered by the user, the arrangement being such that an article can be weighed, the appropriate value of postal charges calculated by the microprocessor and subsequently franked in the same aachine.

BRIEF DESCRIPTION OF THE DRAWINGS

In order that the present invention may be more readily understood, an embodiment thereof will now be described by way of example and with reference to the accompanying drawings, in which:

FIG. 2 is a plan view of one embodiment of an arrangement of keys suitable for the machine of FIG. 1.

DETAILED DESCRIPTION OF THE PREFERRED EMBODIMENTS

Figure 1:
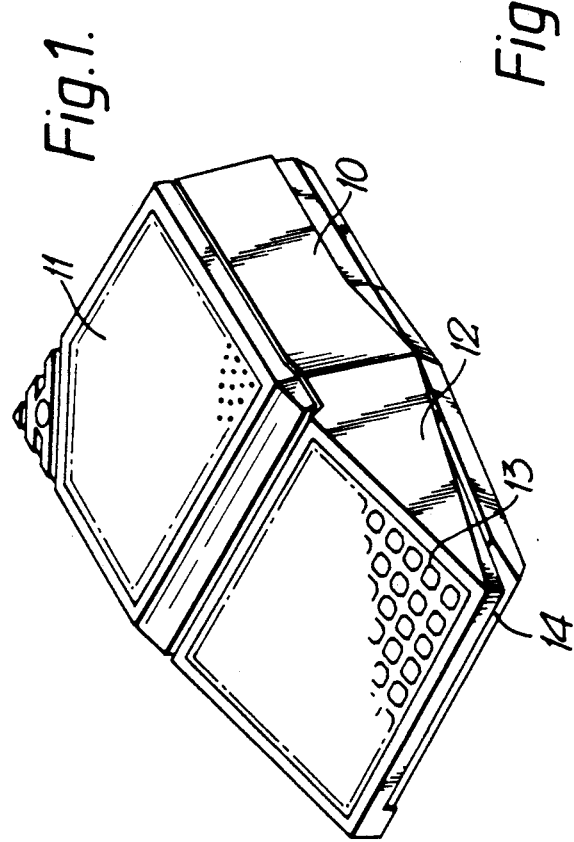
FIG. 1 is a perspective view of a combined weighing and franking machine constructed in accordance with the present invention.

Referring now to the drawings, the combined franking and weighing machine shown in FIG. 1 comprises a two-part body 10 which is a moulding of suitable plastics material. The upper part of body 10 carries a weighing pan 11 and the wedge shaped front portion 12 of the machine carries a keyboard 13. Located below keyboard 13 is a jaw-like opening 14 into which aail to be franked can be inserted so that an internal printer can put the appropriate impress on the surface of the mail. For parcels too large to enter opening 14 it will be appreciated that labels can be inserted into the opening for subsequent application to the parcel.

The keyboard 13 is shown in greater detail in FIG. 2. The board is of the contact-pressure type and is arranged so that the different types of mail to be sent can be selected in response to pictograms. Thus in this embodiment there are five groups of keys 15, 16, 17, 17' and 18 each dealing with a particular class of mail, namely letters, newspapers, printed papers, saall packets and parcels. Each group of keys has an associated pictogram. The key groups enable the user of the machine to sub-divide each of the main categories into the different postal rates which can be applied to that category. Thus key group 15 is divided into three sub-groups each taking up one row. The three sub-groups or rows are respectively Inland Mail, Overseas Mail and Air Mail. Similarly each sub-group is divided still further so that Inland Mail offers the choice of First or Second Class Mail. It will be appreciated that these groupings are given purely by way of example and can be altered for countries with different aail classes. It will also be appreciated that with such a system only a single keystroke is required to make a selection.

If the top row as shown in FIG. 2 is taken as row 1, then the bottom row will be 10. Using this scheme, the keys are allocated thus:

Row 1—Group 15: Inland Letters.
Row 2—Group 15: Overseas Letters.
Row 3—Group 15: Airmail Letters.
Row 4—Group 15: Inland & Europe Newspapers.
Row 5—Group 16: Airmail Newspapers.
Row 6—Group 17: Surface & Europe Printed Papers.
Row 7—Group 17 & 17': Airmail Printed Papers AND Airmail Small Packets.
Row 8—Group 17: Surface & Europe Small Packets.
Row 9—Group 18: Inland Parcels.
Row 10—Group 18: Overseas Parcels.

Figure 5:
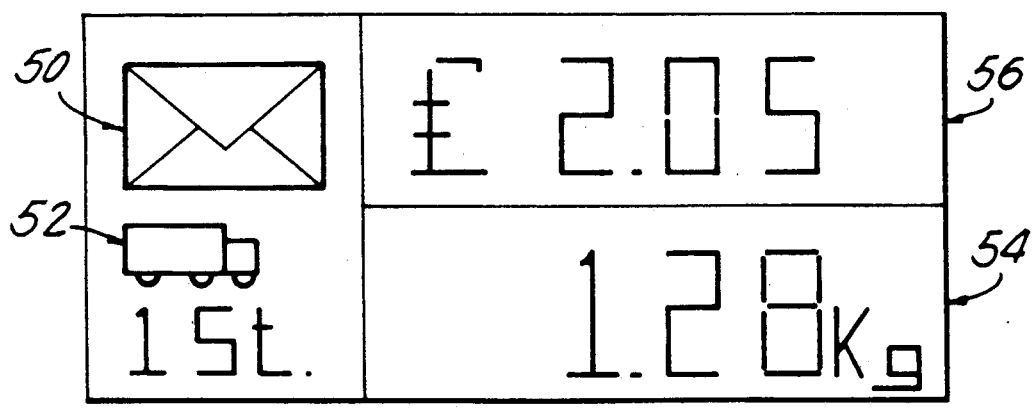
FIG. 5 shows a typical display.

The keyboard includes a liquid crystal display 19. When the user has selected a particular category, group and sub-group by means of the single keystroke an appropriate pictogram, such as envelope 50 incidating a letter, or a truck 52 indicating surface transport will appear on the display to confirm the selection. When an article is placed on the weighing pan 11 the display. 19 will also show both the weight, as indicated in display block 54, e.g. 1.28 kilograms, and the cost, as indicated in display block 56, e.g. 2.05 pounds sterling. A typical display is shown in FIG. 5. This value can be entered by. use of the Enter key 20 but nothing will be printed until the Print key 21 has been depressed.

The keyboard 13 also include a digit-pad 23 for entering data and which can also be used when non standard rates are involved. Finally the keyboard 13 includes four function keys 24 to control programmed operation of a microprocessor and a "smart" card as described below.

Figure 3:
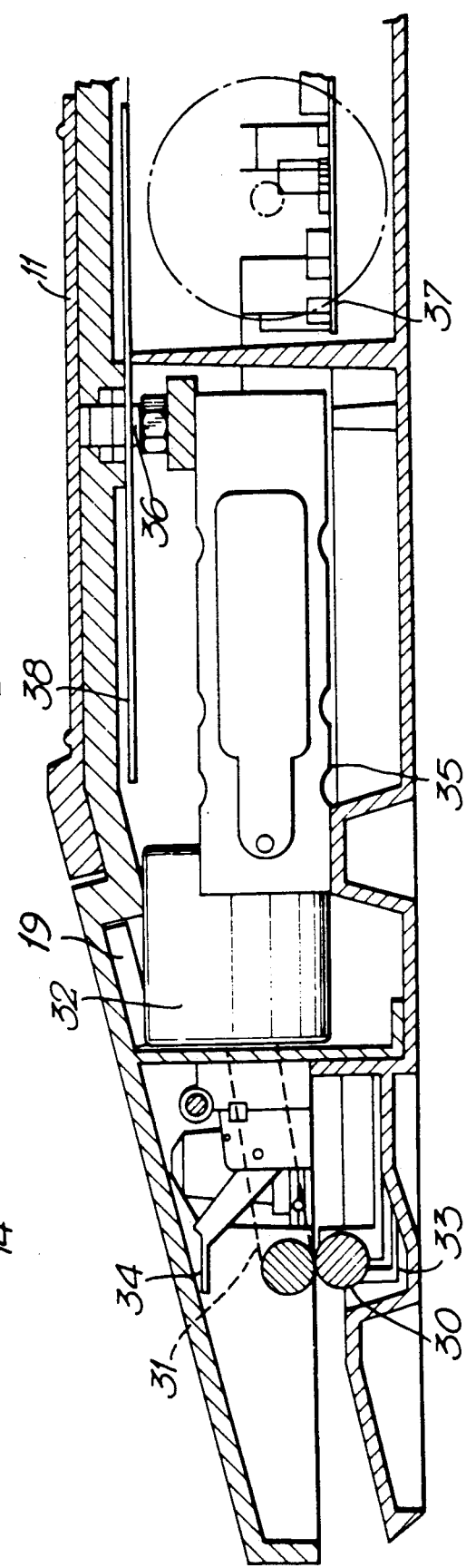
FIG. 3 is a section through the machine of FIG. 1.

FIG. 3 shows a cross-section of some of the basic components of the combined franking and weighing machine. Integers common to FIGS. 1 and 2 remain the same.

From FIG. 3 it can be seen that the opening 14 includes a pair of opposed rollers 30 driven by a belt 31 from a motor 32. Located below rollers 30 are sensors 33 for detecting the insertion of a letter or label and activating the aotor 33 and an ink-jet printer 34 so that the letter or label can be franked with the already calculated value.

It can also be seen that the weigh pan 11 is of a conventional nature and is connected to a conventional load cell 35 by a stem 36. Power for the machine is provided by a power supply unit 37 and the circuitry required to process the output of load cell 35 and respond to the commands input from the keyboard 13 is carried on a printed circuit board 38.

In franking machines the amount of money available for franking post can be set in a number of different ways, the most common of which involves mechanical counters. Once the credit entered has been expended the machine "locks off" and has to be returned to the Post Office to be re-credited.

In the present embodiment the credit available for franking is set by a "smart" card, that is a card with an on-board microprocessor controlled chip. This arrangement allows both for greater flexibility and security. A smart card holds a preset credit limit which when reached will require reprogramming by the Post Office. Thus a user of the machine will normally have at least two cards, one in use and one being replenished.

Figure 4:
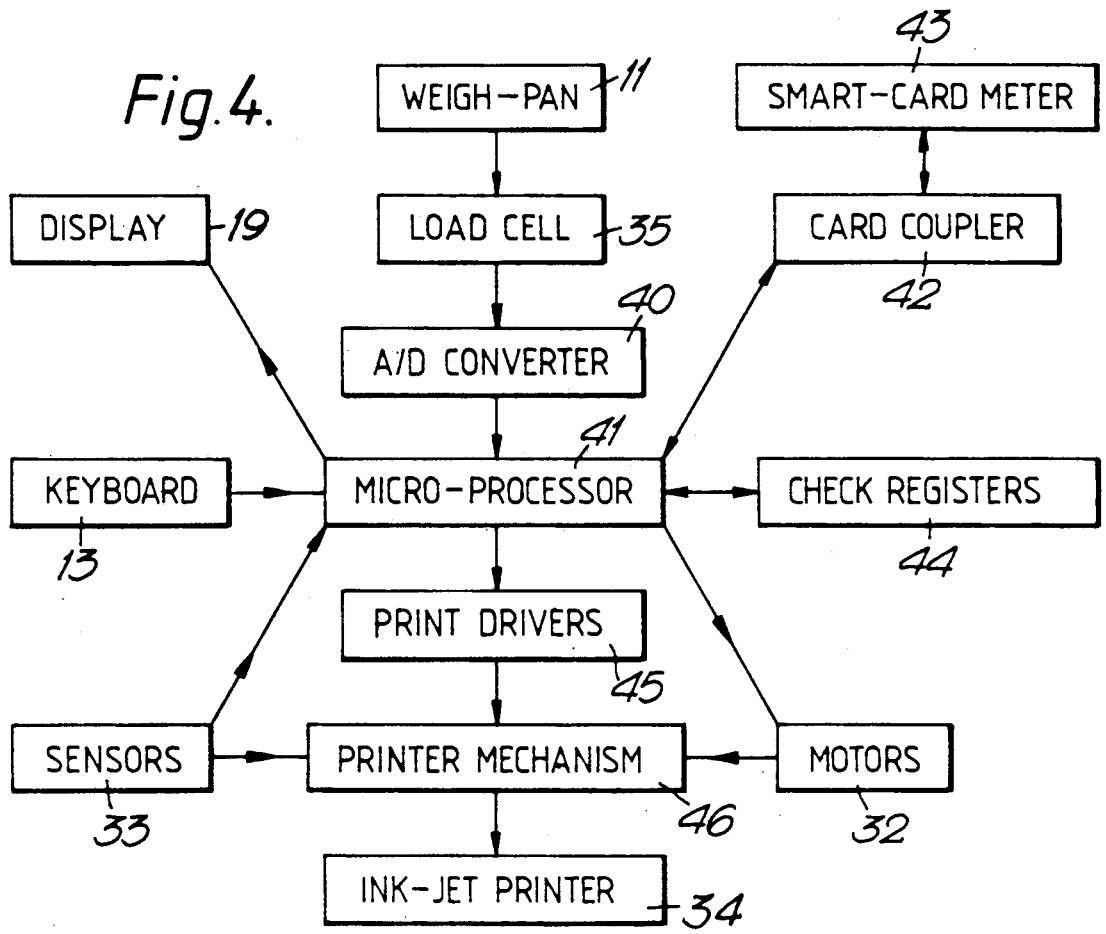
FIG. 4 is a block diagram illustrating the internal structure of the machine.

FIG. 4 of the drawings shows the basic circuit components of the machine shown in FIG. 1. In this Figure the weigh pan and load cell are again shown at 11 and 35. The output of the load cell 35 is connected to an analogue-to-digital converter 40 which converts the analogue output signal of the load cell into a digital signal suitable to be processed by a microprocessor 41. Other inputs to microprocessor 41 are provided by the keyboard 13, the sensor 33 and a card coupler 42 associated with a Smart Card 43 which maintains a record of the state of the Credit available and which can give indications when the credit limit is being approached and has been reached.

The microprocessor 41 is also associated with check registers 44 and provides output signals to the ink-jet printer 34 in a printer driven circuit 45 and printer control mechanism 46. The microprocessor 41 also controls the motor 32.

I claim:

1. A franking machine, comprising:
   (a) a weighing pan for weighing articles;
   (b) a load cell having an output and coupled to the weighing pan;
   (c) printing means for impressing postal franks on the articles;
   (d) microprocessor means responsive to the output of the load cell for controlling operation of the printing means; and
   (e) input means for manually entering a scale of charges appropriate to the article being weighed and franked, said input means including a keyboard having keys arranged in groups, each group relating to a particular class of mail, at least some of the groups of keys being subdivided into sub-groups representing different postal rates that can be applied to the respective sub-group, each group of keys having an associated pictogram,
   whereby the same machine can weigh, calculate the appropriate value of postal charges, and subsequently frank the articles.

2. The franking machine according to claim 1; and further comprising means for setting a limit to the amount available for franking, including means for reading a card with an on-board microprocessor-controlled chip.

3. A franking machine, comprising:
   (a) a weighing pan for weighing articles;
   (b) a load cell having an output and coupled to the weighing pan;
   (c) printing means for impressing postal franks on the articles;
   (d) microprocessor means responsive to the output of the load cell for controlling operation of the printing means; and
   (e) input means for manually entering a scale of charges appropriate to the article being weighed and franked, said input means including a keyboard having keys arranged in groups, each group relating to a particular class of mail, at least some of the groups of keys being subdivided into sub-groups representing different postal rates that can be applied to the respective sub-group, said keyboard further including a liquid crystal display for displaying a pictogram appropriate to at least one of said groups and sub-groups selected by a machine operator,
   whereby the same machine can weight, calculate the appropriate value of postal charges, and subsequently frank the articles.

4. The franking machine according to claim 3; and further comprising means for setting a limit to the amount available for franking, including means for reading a card with an on-board microprocessor-controlled chip.

* * * * *